US009890658B2

(12) United States Patent
Gerzner et al.

(10) Patent No.: US 9,890,658 B2

(45) Date of Patent: Feb. 13, 2018

(54) FIXATION DEVICE FOR TURBINE AND METHOD FOR APPLYING FIXATION

(71) Applicant: ALSTOM Technology Ltd, Baden (CH)

(72) Inventors: Stefan Gerzner, Freudwil (CH); Marc Rauch, Frenkendorf (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 755 days.

(21) Appl. No.: 14/445,130

(22) Filed: Jul. 29, 2014

(65) Prior Publication Data

US 2015/0050138 A1 Feb. 19, 2015

(30) Foreign Application Priority Data

Aug. 15, 2013 (EP) .................................... 13180510

(51) Int. Cl.

*F01D 25/24* (2006.01)
*F01D 5/00* (2006.01)

(Continued)

(52) U.S. Cl.

CPC ........... *F01D 25/243* (2013.01); *F01D 5/005* (2013.01); *F01D 11/00* (2013.01); *F01D 17/08* (2013.01);

(Continued)

(58) Field of Classification Search

CPC ...... F16B 37/061; F16B 37/122; F16B 35/00; F16B 31/043; F01D 25/243; F01D 25/28;

(Continued)

(56) References Cited

U.S. PATENT DOCUMENTS 1,835,921 A 12/1931 Woodruff
1,835,963 A 12/1931 Nevius (Continued)

FOREIGN PATENT DOCUMENTS

CN 2519022 Y 10/2002
CN 1573053 A 2/2005

(Continued)

OTHER PUBLICATIONS

Office Action dated Jul. 27, 2015, by the State Intellectual Property Office, P.R. China in corresponding Chinese Patent Application No. 201410401119.X, and an English Translation of the Office Action. (10 pages).

(Continued)

*Primary Examiner* — Woody Lee, Jr.
*Assistant Examiner* — Joshua R Beebe
(74) *Attorney, Agent, or Firm* — Buchanan Ingersoll & Rooney PC

(57) ABSTRACT

The invention provides a fixation device for a turbine, including a flange mounted on a housing of the turbine and a nut assembly received in the flange to apply fixation to an component inside the housing. The flange is fixed to the housing by a plurality of first bolts and comprises a central threaded hole. The nut assembly comprises a nut body with a first hole formed along the central axis of the nut body and a plurality of second holes formed around the central axis, and a plurality of second bolts received in the respective second holes. The nut body is formed with thread on its outer circumferential surface and fitted within the central threaded hole of the flange. The second bolts are screwed in the second holes to apply fixation against the component inside the housing of the turbine. The nut assembly further comprises a plurality of sleeves received in the respective second holes, and the plurality of second bolts are received in the (Continued)

300 100 200

205 202 200 203 207 204 206 201 respective sleeves. The fixation device in the present invention is able to apply for small and restricted space condition, which makes it possible to position the device very close to the split plane of the turbine. Further, the whole structure of the fixation device is simple with lightweight and easy to assemble with standard tools.

6 Claims, 3 Drawing Sheets

(51) Int. Cl.

*F01D 17/08* (2006.01)
*F01D 25/26* (2006.01)
*F01D 25/28* (2006.01)
*F16J 13/12* (2006.01)
*F01D 11/00* (2006.01)
*F16B 31/04* (2006.01)

(52) U.S. Cl.

CPC .......... *F01D 17/085* (2013.01); *F01D 25/24* (2013.01); *F01D 25/246* (2013.01); *F01D 25/26* (2013.01); *F01D 25/28* (2013.01); *F01D 25/285* (2013.01); *F16J 13/12* (2013.01); *F05D 2240/90* (2013.01); *F16B 31/043* (2013.01); *Y10T 29/4932* (2015.01)

(58) Field of Classification Search

CPC ........ F01D 25/24; F01D 17/08; F01D 17/085; F01D 25/285; F01D 25/26; F01D 25/246; F01D 11/00; F01D 5/005; F05D 2240/90; F16J 13/12; Y10T 29/4932

See application file for complete search history.

(56) References Cited

U.S. PATENT DOCUMENTS 2,995,006 A * 8/1961 Erwinski ................ F02B 33/00 123/66
3,299,766 A * 1/1967 Gould .................. F16B 43/001 277/640
4,441,323 A * 4/1984 Colley .................... F23R 3/283 60/737
5,136,936 A * 8/1992 Holliday ................ B23Q 16/00 101/28
5,516,156 A * 5/1996 Williamson .......... F16L 13/165 285/190
6,199,453 B1 * 3/2001 Steinbock ............ B23P 19/068 29/452
6,263,764 B1 * 7/2001 Steinbock ............ B23P 19/067 29/452
6,860,716 B2 3/2005 Czachor et al.
6,908,272 B2 * 6/2005 Nilsen .................. F16B 37/061 411/171
8,142,144 B2 3/2012 Porte et al.
8,511,637 B2 8/2013 Mitsch
2004/0240987 A1 12/2004 Czachor et al.
2006/0291974 A1 * 12/2006 McGee .............. B25B 27/0014 411/171
2009/0290978 A1 11/2009 Porte et al.
2010/0278611 A1 * 11/2010 Steinbock ............ E21B 17/085 411/393
2011/0120374 A1 5/2011 Bevan et al.

FOREIGN PATENT DOCUMENTS

CN 101490391 A 7/2009
EP 2 518 282 A2 10/2012
JP 2006144708 A 6/2006
KR 20110063750 A 6/2011
WO 2011/070100 A1 6/2011

OTHER PUBLICATIONS

Office Action (Notice of Preliminary Rejection) dated Jan. 8, 2016, by the Korean Intellectual Property Office in corresponding Korean Patent Application No. 10-2014-0103257 and an English translation thereof. (10 pgs).

* cited by examiner

FIXATION DEVICE FOR TURBINE AND METHOD FOR APPLYING FIXATION

CROSS-REFERENCE TO RELATED APPLICATION

This application claims priority to European application 13180510.3 filed Aug. 15, 2013, the contents of which are hereby incorporated in its entirety.

TECHNICAL FIELD

The present invention relates to a fixation device for turbine, in particular, relates to a fixation device to apply fixation and sealing to a component inside a turbine housing, i.e., a component which protrudes into the housing of a turbine. The present invention also relates to a method for applying fixation to a component inside the turbine housing.

BACKGROUND

A gas turbine or a steam turbine operates to produce mechanical work or thrust. The turbine typically has a generator coupled thereto for the purposes of generating electricity. As a general arrangement of a turbine, it comprises a compressor unit, a combustor unit, a rotor, an exhaust unit and an housing to cover around all these units. The housing splits horizontally at the level of the turbine axis to two parts and these two parts are bolted together to form one rigid unit. Some components inside the housing need to be replaced or taken out for maintenance after the turbine is assembled, while it is not practical to always disassemble the two parts of the housing to take out the components. As a normal solution, there are openings in the housing at the location corresponding to the components. The openings are closed and sealed by respective sealing devices. During the maintenance, the sealing device is removed and the component is pulled out. Once the maintenance is done, the component is push back and the sealing device is re-assembled. Because the turbine normally has a high-temperature and high-pressure environment inside the housing, the sealing device needs to provide a high level of sealing and also apply fixation to the component inside the housing.

A conventional standard flange arrangement cannot meet the conditions for sealing a high-temperature and high-pressure environment inside the housing under restricted space conditions. Some other sealing device is used to provide sealing and fixation to the component inside the housing under high-temperature and high-pressure environment. However, such sealing device has a complex structure consisting of many parts. As a result, it is not applicable in a restricted space condition such as at the position close to the split plane of the turbine.

SUMMARY

It is an object of the present invention to solve the technical problems as indicated above.

In one aspect, the invention provides a fixation device for a turbine, comprising a flange 100 mounted on a housing 400 of the turbine and a nut assembly 200 received in the flange to apply fixation to an component 300 inside the housing, wherein the flange 100 is fixed to the housing by a plurality of first bolts 101 and comprises a central threaded hole, and the nut assembly 200 comprises a nut body 201 with a first hole 206 formed along the central axis of the nut body, a plurality of second holes 207 formed around the central axis, and a plurality of second bolts 202 received in the respective second holes, wherein the nut body is formed with thread on its outer circumferential surface and fitted within the central threaded hole of the flange, and the second bolts are screwed in the second holes to apply fixation against the component 300 inside the housing of the turbine. The nut assembly 200 further comprises a plurality of sleeves 203 received in the respective second holes 207, and the plurality of second bolts 202 are received in the respective sleeves 203.

In another aspect, the invention provides a method for applying fixation to a component 300 inside a housing 400 of a turbine with the fixation device as described above, comprising the following steps:

- mounting the flange 100 on the housing 400 through the plurality of first bolts 101;
- screwing up the nut assembly 200 into the central threaded hole of the flange;
- tightening the second bolts 202 to apply fixation against the component inside the housing.

The fixation device in the present invention is suitable for small and restricted space condition, which makes it possible to position the device very close to the split plane of the turbine. Further, the whole structure of the fixation device is simple with lightweight and easy to assemble with standard tools. Furthermore, the design of the fixation device of the present invention allows a redundant opportunity to disassemble the whole unit by easily removing the flange in case that the nut assembly is stuck due to the possible damage in the severe environment inside the turbine housing.

BRIEF DESCRIPTION OF THE DRAWINGS

The invention shall subsequently be explained in more detail based on exemplary embodiments in conjunction with the drawing. In the drawing.

DETAILED DESCRIPTION

Figure 1:
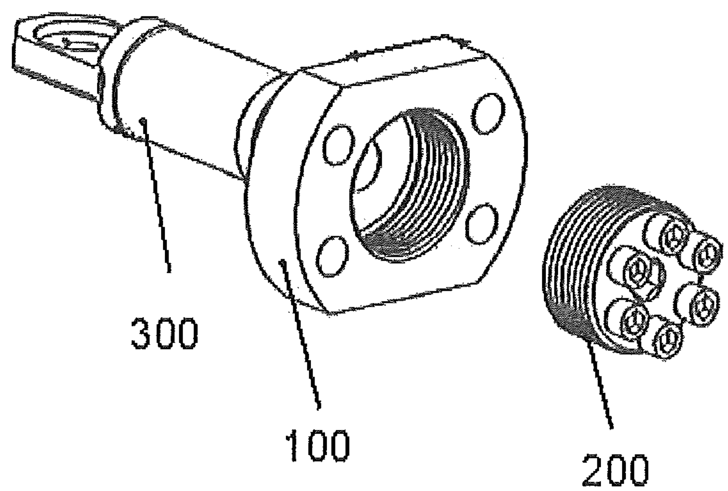
FIG. 1 is a schematic view showing the fixation device before assembling.
Figure 2:
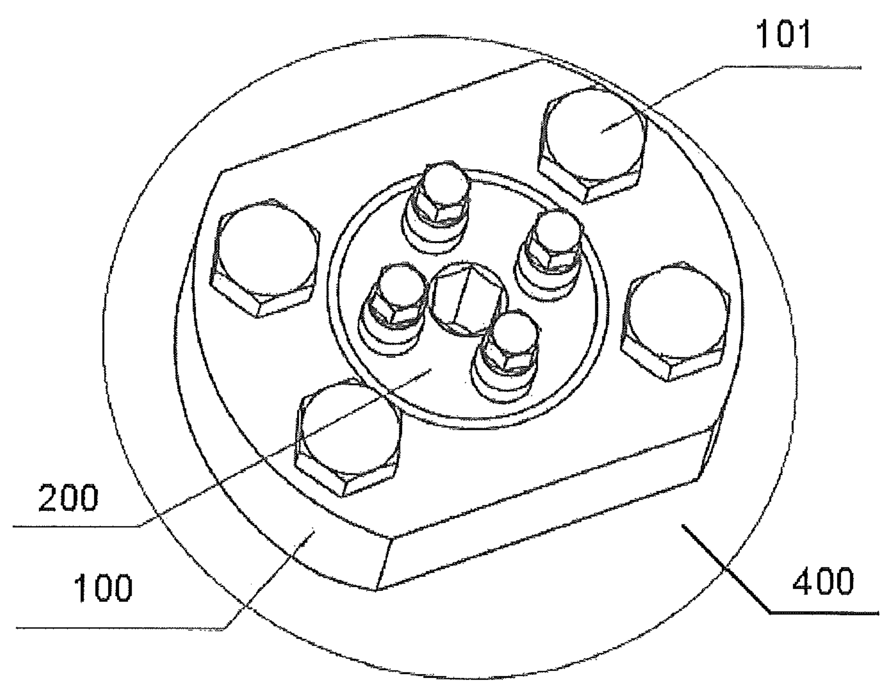
FIG. 2 is a perspective view showing the fixation device after assembling.
Figure 3:
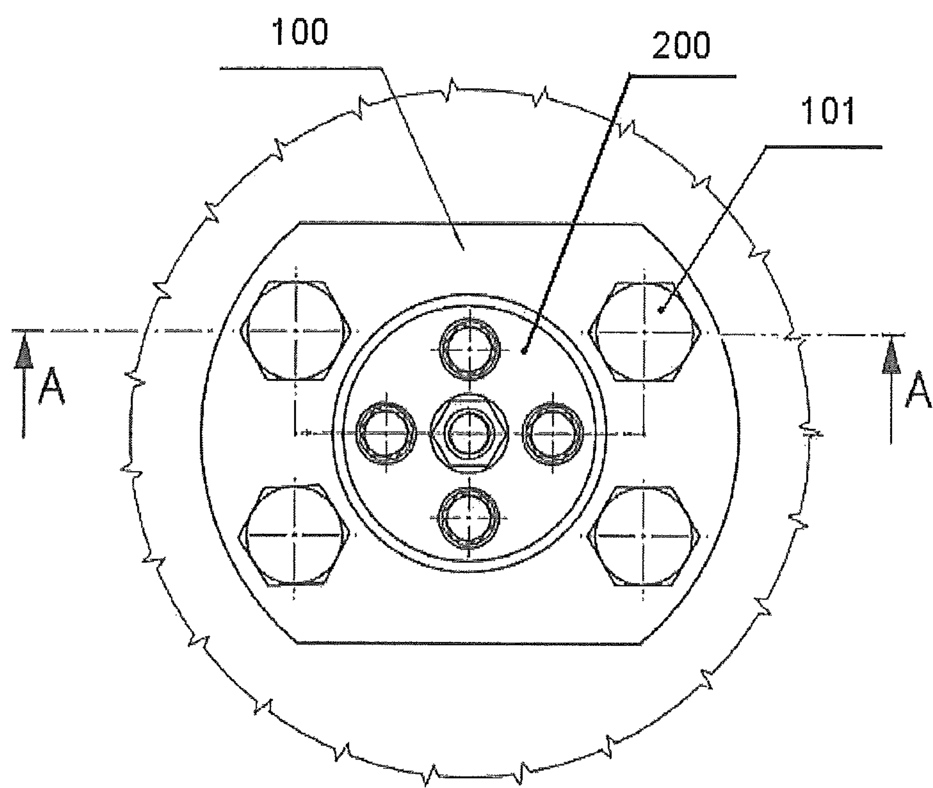
FIG. 3 is a top view showing the fixation device.

FIG. 1 shows a schematic view of the fixation device for a turbine in exploded-view manner. The fixation device includes two major parts, a flange 100 and a nut assembly 200. The part 300 is a component installed inside a housing of the turbine as mentioned in the above "Background of Invention" section. The component 300 protrudes into the housing and can be pulled out during the maintenance. The flange 100 is mounted on the housing 400 via a plurality of bolts 101, as shown in FIG. 2, FIG. 2 shows the fixation device when it is assembled and mounted together onto the housing 400. The housing 400 is partially shown in FIG. 2 just for reference. FIG. 3 shows a top view of the fixation device in FIG. 2.

Figure 4:
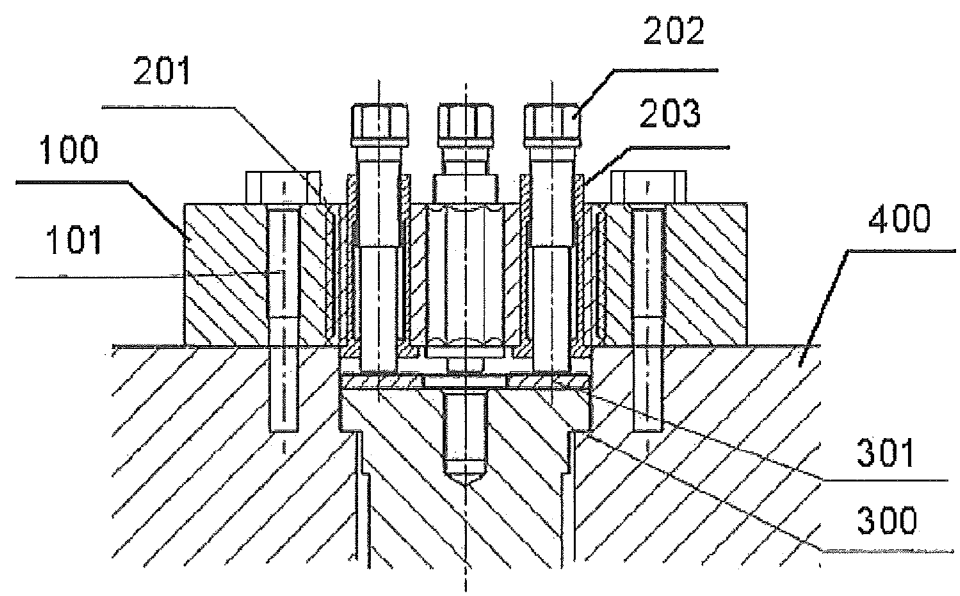
FIG. 4 is a plan cross-section view of the fixation device along the foldline A-A in FIG. 3.

FIG. 4 is a cross-section view of the fixation device along the foldline A-A in FIG. 3, so as to show both the section views of the bolts 101 and the nut assembly 200 in one figure. The embodiment of present invention will be described in detail with reference to this figure. As shown in FIG. 4, the flange 100 is mounted on the housing 400 through bolts 101. The number of the bolts 101 in the figures is shown as four. However, there is no strict limit for this number as long as the flange 100 is able to fix onto the housing 400. Further, the bolt 101 is not limited to the screw bolt as shown in FIG. 4. It can also be other fixing means, such as rivet and the like, as long as the fixing of the flange 100 is achieved. The flange 100 comprises a central threaded hole and a nut assembly 200 is received in this central threaded hole (also referring to FIG. 1).

Figure 5:
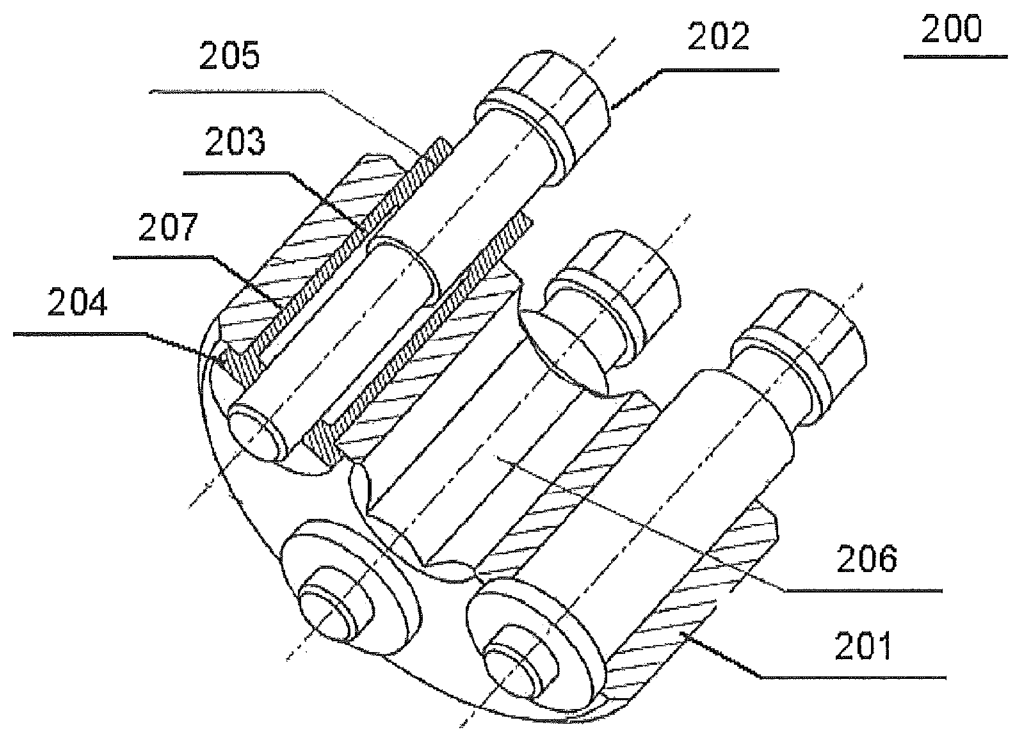
FIG. 5 is a perspective cross-section view showing the nut assembly of the fixation device.

With reference to FIG. 4 and FIG. 5, the nut assembly 200 comprises a nut body 201 with thread on its outer circumferential surface. A first hole 206 is formed along the central axis of the nut body 201 and a plurality of second holes 207 are formed around the central axis. The first hole 206 is formed as a profiled hole to receive an assembly tool to apply tightening action. In an example embodiment, the first hole 206 is a hexagonal hole. Besides the hexagonal hole, all other form-fit joints to receive an assembly tool for tightening are also workable. The nut assembly 200 also comprises a plurality of second bolts 202 and respective sleeves 203 corresponding to the number of the second holes 207. The sleeve 203 is received in each second hole 207. The sleeve 203 comprises a collar 204 at one end thereof to abut on the lower end of the nut body 201, and an inner thread 205 at the other end of the sleeve. In an example embodiment, the collar 204 is welded to the nut body 201. The second bolt 202 is received in the sleeve 203 and screwed with the inner thread 205. In an example embodiment, the second bolt 202 comprises a threaded section to fit with the inner thread 205 and a pressing section to abut and apply fixation on the component inside the housing, while the diameter of the pressing section is smaller than that of the threaded section. There are four sets of second bolt 202 and sleeve 203 being arranged as shown in the figures. However, there is no limit to this number but depends on the actual situation as required, such as the fixation force to be applied.

With the arrangement of the nut assembly 200 as shown in FIG. 5, the second bolt 202 is carried by the sleeve 203, which is elastic like the waisted shank of a common expansion bolt. Thus, the elastic pretension of the second bolt 202 is possible and this is important for hot temperature application inside the housing of the turbine and high temperature gradients in transient operation.

In an alternative embodiment, the second hole 207 is formed with inner thread to directly receive the second bolt 202. In this arrangement, there is no need to arrange the sleeve 203 in the nut assembly 200.

In an alternative embodiment, the flange 100 can be replaced by machining a threaded hole directly into the housing 400. Thus, the nut assembly 200 can be mounted directly into this threaded hole. This improves the space requirement to absolute minimum. However, it may make the repair or replacement of the assembly more difficult in case of damage.

Further referring to FIG. 4, the nut assembly 200 is mounted within the central threaded hole of the flange 100 to close the opening in the housing 400. Then the second bolt 202 can be tightened to apply the fixation and sealing to the component 300. In an example embodiment, an intermediate ring 301 is disposed between the component 300 and the second bolts 202 so as to distribute the bolt force more evenly for fixation.

Now the method for applying fixation to the component 300 with the fixation device of the present invention is described below with reference to FIGS. 1 and 4. As a first step, the flange 100 is mounted on the housing 400 of the turbine through a plurality of the first bolts 101. Then, the nut assembly 200 is screwed up into the central threaded hole of the flange 100. An assembly tool will be inserted into the first hole 206 to screw up the nut assembly. As a third step, the second bolts 202 are tightened to apply fixation against the component 300 inside the housing 400. With the fixation device of present invention, it allows to apply very high fixation force to the component 300. Specially, the very high surface pressure for the common direct metal to metal sealing can be achieved easily and with little space consumption.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fixation device for a turbine, comprising:

a flange mounted on a housing of the turbine; and a nut assembly received in the flange to apply fixation to a component inside the housing, wherein the flange is fixed to the housing by a plurality of first bolts and includes a central threaded hole, and wherein the nut assembly includes a nut body with a first hole formed along the central axis of the nut body and a plurality of second holes formed around the central axis, and a plurality of second bolts received in the respective second holes, wherein the nut body is formed with the thread on its outer circumferential surface and fitted within the central threaded hole of the flange, and the second bolts are screwed in the second holes to apply fixation against the component inside the housing of the turbine, wherein the nut assembly includes a plurality of sleeves received in the respective second holes, and the plurality of second bolts are received in the respective sleeves, wherein the sleeves include an inner thread proximate the inlet opening for the second bolt, and a collar at one end distal to the inlet opening for the second bolt.

2. The fixation device of claim 1, wherein the collar of the sleeve is welded to the nut body.

3. The fixation device of claim 1, wherein the second bolt comprises:

a threaded section to fit with the inner thread of the sleeve and a pressing section to abut and apply fixation on the component inside the housing.

4. The fixation device of claim 3, wherein the diameter of the pressing section is smaller than that of the threaded section.

5. The fixation device of claim 1, wherein the first hole of the nut body is a hexagonal hole to receive an assembly tool to screw up the nut assembly relative to the flange.

6. A method for applying fixation to a component inside a housing of a turbine with the fixation device of claim 1, the method comprising:

a. mounting the flange on the housing through the plurality of first bolts;

b. screwing up the nut assembly into the central threaded hole of the flange; and c. tightening the second bolts to apply fixation to the component inside the housing.

* * * * *